Jan. 30, 1962  H. H. GROBECKER  3,018,819
TUBE BEADING APPARATUS
Filed Oct. 13, 1959  3 Sheets-Sheet 2

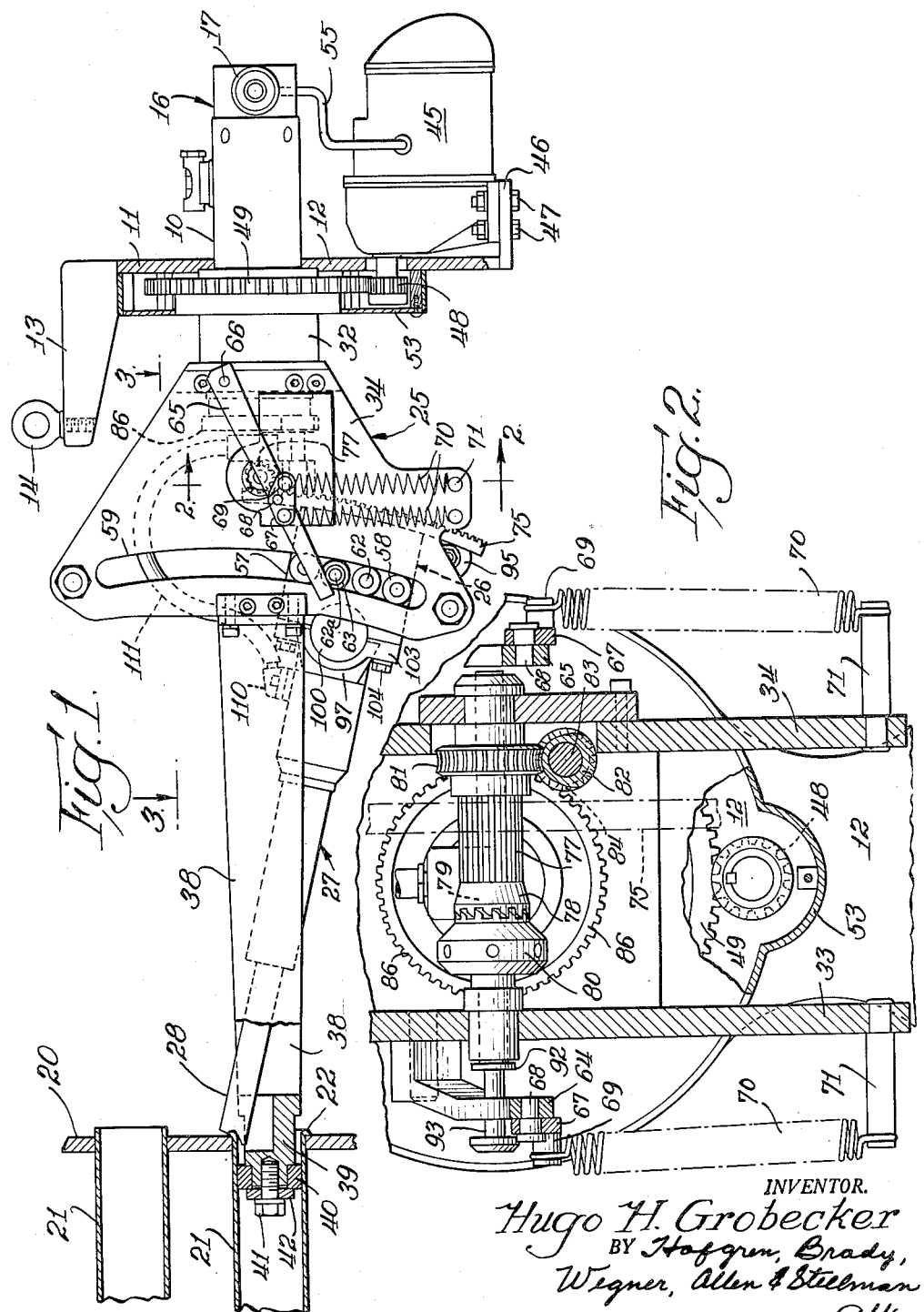

INVENTOR.
Hugo H. Grobecker
BY Hofgren, Brady,
Wegner, Allen & Stellman
Att'ys.

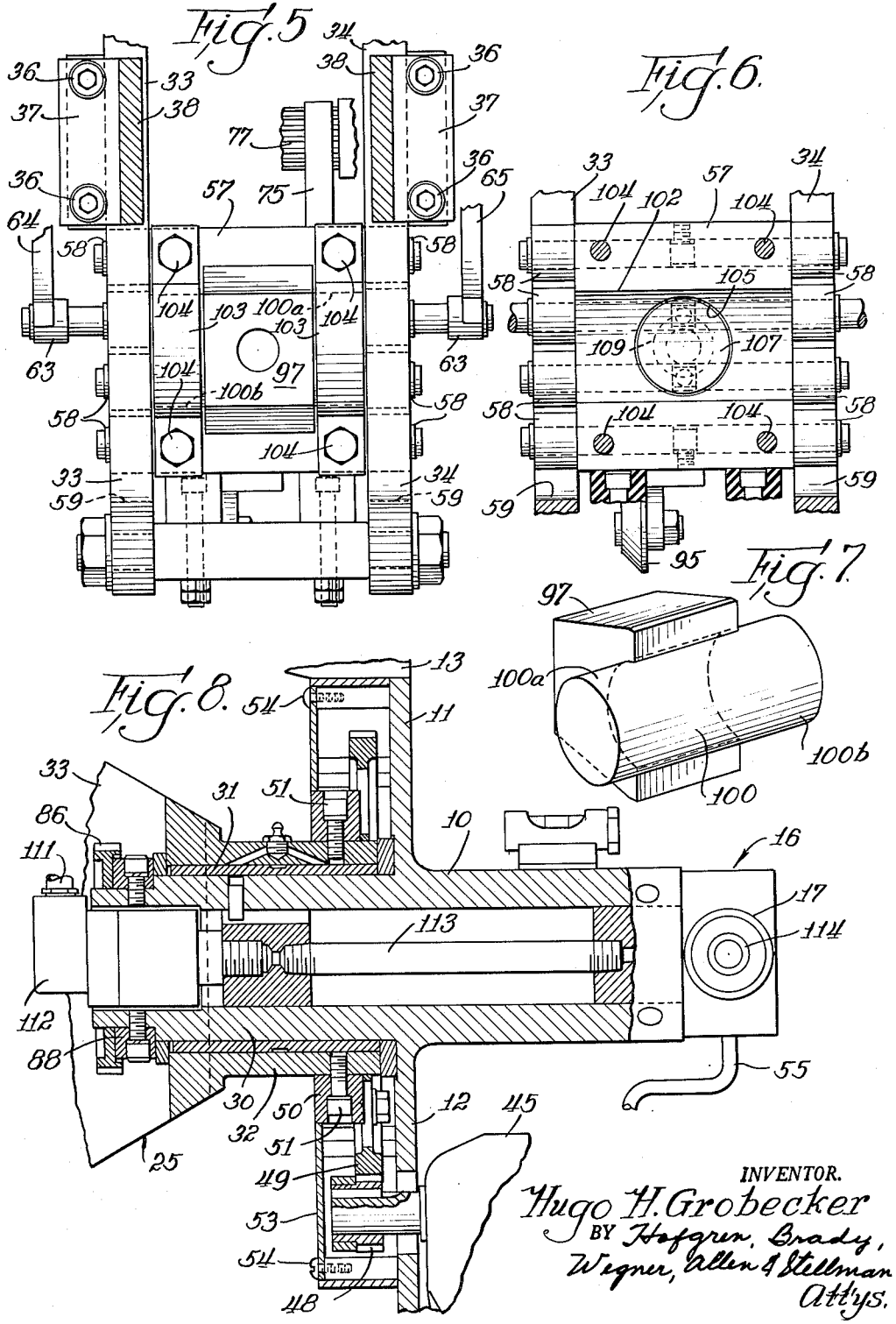

United States Patent Office 3,018,819
Patented Jan. 30, 1962

3,018,819
TUBE BEADING APPARATUS
Hugo H. Grobecker, Milwaukee, Wis., assignor to Cleaver-Brooks Company, a corporation of Wisconsin
Filed Oct. 13, 1959, Ser. No. 846,204
5 Claims. (Cl. 153—81)

This invention relates to apparatus for making a bead on the end of a tube and more particularly to a machine which is positionable adjacent a tube end such as the end of a boiler tube and which, while thus positioned, may be operated to automatically bead the tube end.

In the past, the beading of the ends of boiler tubes has been accomplished largely by means of an air hammer having a tool member provided with an outer tube engaging portion shaped much like the thumb and forefinger of a person's hand. Such a tool member is used with the forefinger part extending into the tube and with the primary beading force being applied in the curve of the tool member between the thumb and forefinger. The tube bead is made on the outside of the boiler tube sheet to seal the tube in the sheet and also to secure the tube in the sheet against accidental removal. The bead is ordinarily of a half toroidal shape and is formed by the workman starting with a tube which has been flared slightly. The operation requires that the air hammer be directed at the tube bead at an angle to the inside surface of the tube and gradually changed until the finishing operation is done with the air hammer at an angle to the outside of the tube. It will be appreciated that this changing angle must be applied around the entire circumference of the tube end. Considerable practice and skill are required before a workman can produce a satisfactory tube bead which is smooth and regular in appearance as well as satisfactory structurally.

It is a general object of the present invention to provide a new and improved machine for beading tube ends automatically once the machine is properly positioned.

A more specific object is to provide a new and improved machine of the type described including a support having a carrier rotatable thereon about an axis coincident with the axis of a tube end which is to be beaded, a tool holder movably mounted on the carrier to pivot about an axis passing through the tube engaging portion of the tool and tangent to the tube end, and means mounting the tool on the holder to pivot about an axis parallel to the first mentioned axis in order to facilitate movement of the tube engaging portion of the tool radially of the tube to conform to variations in tube diameter.

An important advantage in the present machine over prior machines of similar nature lies in pivotally mounting the tool on the tool holder to permit movement of the tube engaging portion of the tool radially relative to the tube. The pivotal movement thus provided is of a limited nature, but nevertheless facilitates use of the tool on a tube where there may be minor variations in the diameter of the tube and it also facilitates use of the tool on tubes of different diameter within the range of the pivotal movement. Preferably, pivotal movement of the tool on the tool holder is frictionally retarded in order to maintain the tool against accidental movement from a position to which it is moved.

Other objects and advantages will become readily apparent from the following detailed description taken in connection with the accompanying drawings, in which:

FIG. 1 is a side elevational view, partly in section, of a new and improved apparatus constructed according to the principles of the present invention;

FIG. 2 is an enlarged fragmentary sectional view taken at about the line 2—2 of FIG. 1;

FIG. 5 is a fragmentary sectional view taken at about the line 5—5 of FIG. 4;

FIG. 6 is a fragmentary sectional view taken at about the line 6—6 of FIG. 4, but illustrating the arcuate tool holder guides in elevation;

FIG. 7 is a perspective view of a bearing which is attached to the tool for pivotally mounting the same on the tool holder; and FIG. 8 is a fragmentary sectional view taken at about the line 8—8 of FIG. 2.

Figure 3:
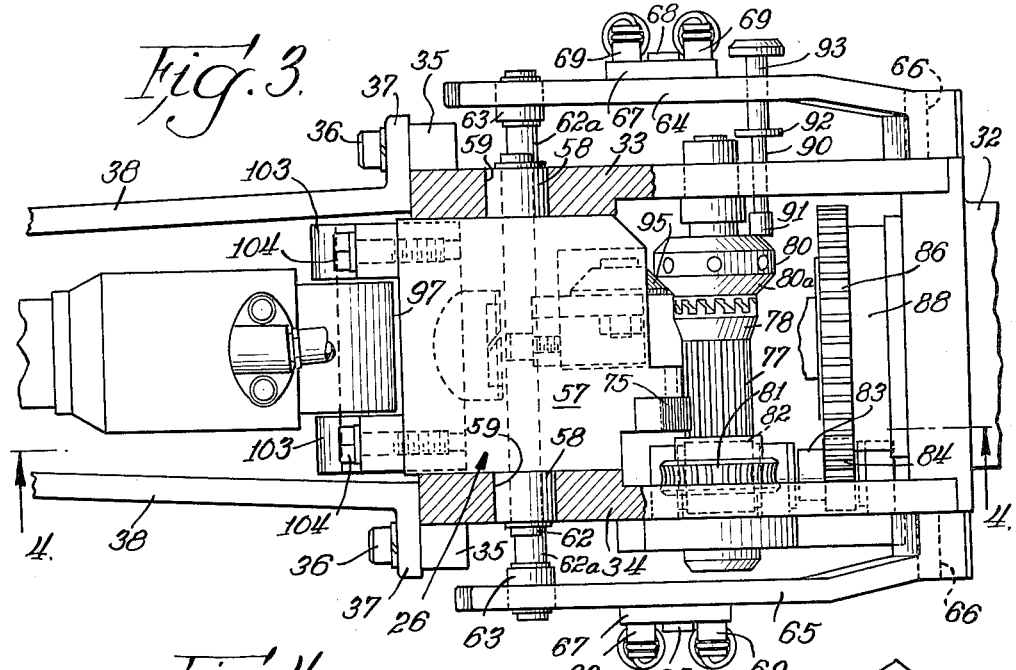
FIG. 3 is an enlarged fragmentary sectional view taken at about the line 3—3 of FIG. 1.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings in more detail, a machine constructed according to the principles of the present invention includes a supporting structure or base in the form of a tubular member 10 (FIGS. 1 and 8) having integral therewith or welded theron an upright plate including an upper portion 11 and a lower portion 12. Preferably, the upper portion 11 is provided with an arm or extension 13 to which a hook 14 is attached to facilitate attachment to a crane or other carrier in a workshop for moving the machine from place to place. Additionally, it is preferable to provide the tubular member with a handle 16 preferably including opposite laterally extending hand grip members as at 17 (one visible), both of which are preferably tubular. An operator may thus grasp the handle portions 17 while the machine is suspended by a crane or the like as at 14 and suitably position the tool relative to a tube end to be beaded.

A typical work piece is illustrated at the left of FIG. 1 in the form of an upright boiler tube sheet 20 having a plurality of tubes as at 21, the ends of which project slightly outwardly beyond the tube sheet and are to be beaded into the tube sheet as shown at 22 in order to seal the tube in the tube sheet and in order to retain the tube against accidental removal from the sheet.

The base or frame of the machine as described supports a carrier generally designated 25 which is rotatable about a longitudinal axis coincident with one of the tubes 21 when the machine is properly positioned for a beading operation. A tool holder 26 is mounted on the carrier 25 for movement along an arcuate path which crosses the axis of the carrier 25. The tool holder has mounted thereon a tube beading tool in the form of a conventional air hammer 27 carrying a tool member 28 to engage and bead a tube end.

In order to mount the carrier 25 for rotation on the base, the tubular member 10 includes an extension 30 (FIG. 8) on which there is preferably fitted a bronze sleeve bearing 31. The carrier 25 is formed with a tubular bearing portion 32 which is fitted on the bearing sleeve 31. At the left end as viewed in FIG. 8, the bearing portion 32 of the carrier is enlarged and provided with spaced parallel frame plates 33 and 34 which provide a housing or partial enclosure and support other parts of the machine. At the left end, as viewed in FIGS. 1, 3 and 4, the plates 33 and 34 are formed with similar laterally outwardly directed lugs as at 35, and to each lug there is attached as by screws 36 the base flange 37 of an elongate plate or strap 38. The plates 38 straddle the tube beading tool 27, 28 and at the opposite ends are joined by a crosspiece as at 39 (FIG. 1) which provides a support for a roller or bearing as at 40 adapted for insertion into the tube which is to be beaded. The bearing 40 may be suitably retained in position on a reduced end portion of the connecting crosspiece 39 as by means of a screw 41 and a washer 42.

Rotation of the carrier 25 on the base is preferably obtained by means of a rotary air operated motor as at 45 (FIG. 1) which may be mounted on the lower plate portion 12 and the latter is provided with a mounting flange or support 46 to which the motor 45 may be attached as by bolts or screws 47. The motor includes an output shaft having a drive pinion 48 thereon, and the pinion 48 meshes with a larger gear 49 (see also FIG. 8) which is suitably secured to a hub 50 in turn secured on the tubular portion 32 of the carrier as by screws 51. The gears 48 and 49 are preferably enclosed by a suitable cover member as at 53 which may be attached to the base as by screws illustrated at 54.

The motor 45 may be supplied with air under pressure through a tube as illustrated at 57 suitably connected to the motor at one end and at the opposite end preferably connected to a valve apparatus in the tubular hand grip portion 17 which is not visible in FIG. 1. This may be referred to as the right-hand grip. The valve may be in turn connected with a suitable source of air under pressure through the open end of such hand grip.

The tool holder 26 which is movably mounted on the carrier 25 preferably takes the form of a block 57 provided at opposite sides with a series of guide rollers as at 58 (four on each side as illustrated) fitted in complementary arcuately shaped slots 59 provided respectively in the plates 33 and 34 on the carrier 25. The fit of the rollers 58 in the guide slots 59 enables arcuate movement of the block to pivot the tube engaging portion of the tool about an axis tangent to the tube end which is to be beaded, as the center of the arcuate guides is located approximately at the tube engaging portion of the tool.

The rollers 58 are preferably mounted by means of pins as at 62 suitably anchored in the block 57, and one of the pins at each side of the block, as at 62a, is elongated with respect to the others so as to extend laterally outwardly a substantially greater distance, as seen best in FIG. 3. Each of the pins 62a carries a roller 63 engaged by a spring biased lever as at 64 and 65 in order to normally maintain the block 57 in the lowermost position as illustrated in FIGS. 1 and 4.

Figure 4:
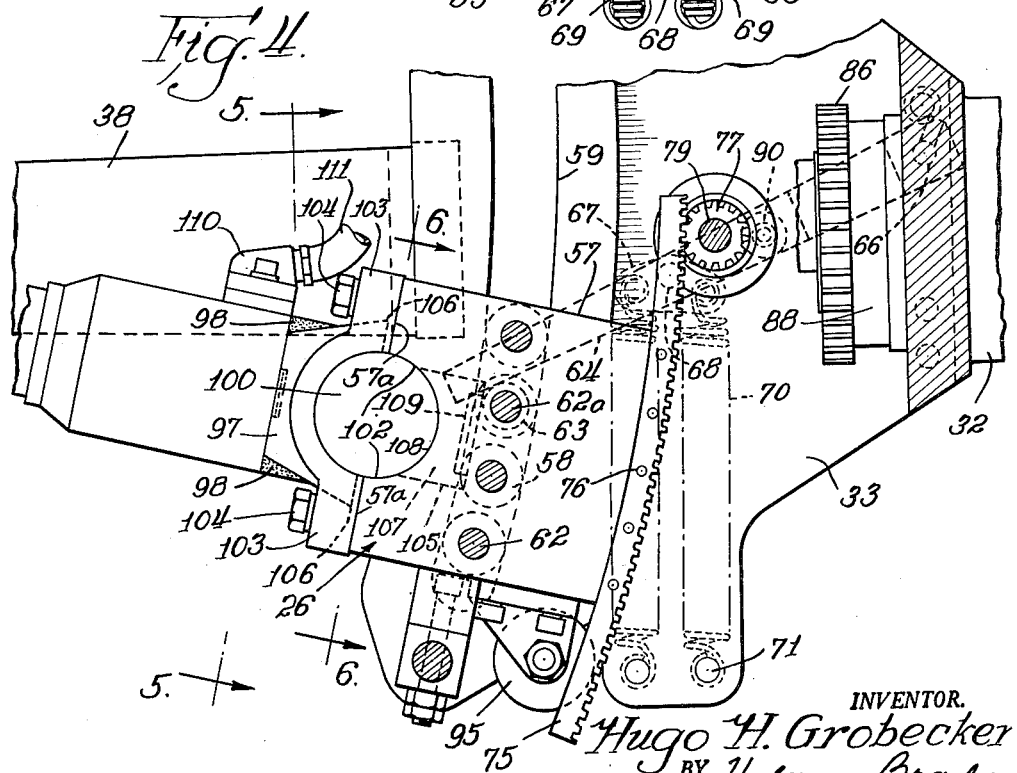
FIG. 4 is a fragmentary sectional view taken at about the line 4—4 of FIG. 3.

The levers 64 and 65, at the right end as viewed in FIGS. 1, 3 and 4, are pivoted respectively on the plates 33 and 34 as illustrated at 66, and each of the levers carries a small bracket 67 pivoted thereon as at 68 and provided with a pair of pins 69 projecting laterally outwardly. The pins function as anchors for the upper ends of a pair of tension spring 70 having their lower ends anchored on the side plates 33 and 34 as at 71.

Movement of the block 57 upwardly along the arcuate guides 59 is effected by means of an arcuately curved rack gear 75 suitably secured on the block as at 76 (FIG. 4) and meshing with a drive pinion 77. The drive pinion 77 is formed integrally with a driven clutch member 78 in the form of a sleeve rotatable on a drive shaft 79. A driving clutch member 80 is secured on the drive shaft 79 for rotation therewith and for axial sliding movement toward and away from the side plate 33. As illustrated in FIGS. 2 and 3, the driving clutch member is engaged with the driven clutch member 78. The drive shaft 79 in turn carries a worm gear 81 fixed thereon for rotation therewith and meshing with a driving worm 82 on a shaft 83. The shaft 83 is rotatably mounted in the carrier 25 and at the right end as viewed in FIG. 3, carries a pinion 84 which revolves with the carrier 25 and engages a stationary gear 86 on the machine base. As viewed in FIG. 8, the gear 86 is suitably attached to the tubular extension 30 of the tubular frame part 10 as by means of a hub 88 suitably secured to the gear and to the tubular extension 30. It will be understood that with the arrangement described, as the carrier 25 is rotated by the motor 45 and gears 48 and 49, the pinion 84 is carried therewith and revolved about the stationary gear 86. This causes rotation of the pinion 84 as well as the gearing connected therewith.

Actuation of the driving clutch element 80 into and out of engagement with the driven clutch element 78 is effected by means including a clutch actuating pin 90 laterally slidable in the side plate 33 of the rotary carrier 25. As best seen in FIG. 3, the pin 90 has an enlarged head 91 at one end engageable with the driving clutch element 80 and an enlarged head 92 at the opposite end which is engageable by a plunger 93. The plunger 93 is laterally slidably mounted in the spring biased arm 64 and is positioned so that it will engage the head 92 when the arm 64 is in the lowermost position as illustrated in the drawings. Thus, when the tool holder block 57 is in the lowermost position, and the tool 27, 28 is inclined outwardly at an angle relative to the inner surface of a tube 21, the clutch 80, 78 may be engaged in order to facilitate driving the rack 75 to cause movement of the block 57 along the arcuate tracks 59 in order to pivot the tool 27, 28 upwardly as viewed in FIGS. 1 and 4 about the tube engaging portion thereof to a final position wherein the tool is inclined inwardly relative to the outer surface of a tube 21. This pivotal movement occurs, of course, as the carrier 25 is being rotated so that the bead is formed on the tube end progressively about the circumference of the tube (by virtue of the carrier rotation) and progressively from a slightly flared form to a completed half toroidal form (by virtue of the pivotal movement of the tool holder block 57).

In order to disengage the driving clutch element 80 from the driven clutch element 78, at the end of the pivotal movement of the block 57, the block carries a camming roller 95 of frusto-conical configuration which is engageable with a frusto-conical surface 80a on the driving clutch element 80 at the end of the pivotal stroke of the tool holder block 57. It will be understood that upon disengagement of the clutch elements 78, 80, the tension springs 70 are effective to return the tool holder block 57 downwardly to the position illustrated in FIGS. 1 and 4. The springs bias the arms 64 and 65 downwardly and these in turn act upon the rollers 63 projecting laterally outwardly from opposite sides of the block.

The tool in the form of a conventional commercially available air hammer 27 and a tube beading tool member 28 carried thereby is mounted for limited pivotal movement on the tool holder block 57 about an axis parallel to the pivot axis of the tool at the center of the arcuate guideways 59. To this end, a mounting block 97 is welded as at 98 or otherwise suitably secured to the base of the air hammer 27, and the block 97 in turn has a cylindrical bearing member 100 welded thereto and projecting laterally outwardly at opposite sides of the mounting block 97, as at 100a and 100b (FIG. 7). The tool holder block 57 is formed with a complementary semi-cylindrical bearing seat 102 which pivotably receives the cylindrical bearing member 100 to enable pivotal movement of the tool relative to the block 57. The bearing member 100 is retained in the seat 102 by means of bearing straps at opposite ends of the bearing member as at 103, such straps being suitably secured to the block 57 as by bolts or screws 104. Preferably, the bearing seat 102 is formed with a centrally positioned socket or recess 106 which receives a tension block or friction block 107 having an arcuately curved face as at 108 (FIG. 4) which engages the outer surface of the cylindrical bearing member 100. The block 107 is urged outwardly of its socket by means of a spring washer 109 in the bottom of socket 106 to thereby exert a frictional drag on pivotal movement of the bearing member 100 in its bearing seat 102. It will be understood that this frictionally retards pivotal movement of the tool relative to the tool holder block 57 to prevent the tool from flopping about freely and instead retain it in position against accidental movement.

Pivotal movement of the cylindrical bearing member 100, and therefore the beading tool, relative to the tool holder block 57 is limited by stop means including the upper and lower edges 106 of the mounting block 97 which are engageable with the surface of the tool holder block 57 as at 57a.

Air under pressure may be supplied to the air hammer 27 to effect its operation by means including an inlet fixture 110 on the hammer, a conduit as at 111, and a fixture as at 112 (FIG. 8) connected to the base or support 10. As illustrated, the tubular support member 10 may be provided with suitable conduit means including a pipe as at 113 connected at one end to the fixture 112 and connected at the opposite end to a valve mechanism which may be conveniently mounted in the hand grip portion 17 illustrated. The hand grip portion 17 may be conveniently provided with a valve actuating button, and at the open end of the hand grip portion the valve mechanism may be connected as by a conduit 114 with a suitable source of air under pressure.

It will be appreciated that an important advantage in the present construction over prior machines of a similar nature resides in the pivotal mounting of the tube beading tool including the air hammer 27 and the tube engaging tool member 28 on the tool holder block 57 for limited pivotal movement. This oscillatory mounting of the tool adapts it to automatically conform to slight variations in the diameter of a particular tube due to manufacturing or other tolerances and also readily adapts the tool for conformation automatically to tubes of different diameters within the range of movement provided by the oscillatory mounting. While the movement of the mounting block 97 relative to the tool holder block 57, as viewed in FIG. 4, within the limits provided by the stop means 106 and 57a is rather limited, it will be appreciated that the materially greater length of the line from the pivot axis to the tube engaging portion of the tool as compared to the line between the pivot axis and the stop means will afford a substantial degree of movement at the tube engaging portion of the tool member 28.

I claim:
1. A tube beading apparatus, comprising, a support, a tool carrier rotatably mounted on the support, a beading tool on the carrier having a reciprocable forked tube engaging portion for forming a bead on the tube end progressively about the tube periphery, means for rotating the carrier on the support to move the tool around the tube periphery, means mounting the tool for limited pivotal movement on the carrier about an axis enabling movement of the tube engaging portion of the tool radially of the tool carrier axis during rotation of the carrier thereby to enable the tube engaging portion of the tool to conform to irregularities in the diameter of the tube, and cooperable stop means on the tool and the carrier for limiting said last mentioned movement to a predetermined amount in opposite directions.

2. A tube beading apparatus, comprising, a support, a carrier on the support, a tool holder on the carrier, a beading tool on the holder having a reciprocable forked tube engaging portion for forming a bead on the tube progressively about the tube periphery, means mounting the carrier for rotation on the support to move the tool around the tube periphery, means mounting the holder for movement on the carrier to pivot the tool about the tube engaging portion thereof to change the angle of approach of the tool to the tube between outward and inward, means for rotating the carrier and simultaneously moving the tool holder on the carrier, means mounting the tool on the holder for pivotal movement about an axis parallel to the pivot axis of the tool holder during rotation of the carrier and movement of the holder on the carrier to enable said tube engaging portion to conform to variations in the diameter of the tube, and cooperable stop means on the tool and the holder for limiting said last mentioned pivotal movement to a predetermined amount in opposite directions.

3. A tube beading apparatus, comprising, a support, a carrier rotatably mounted on the support, arcuate guide means on the tool carrier extending across the axis of the carrier and having its center located laterally of the axis of the carrier, a tool holder mounted for movement on a said guide means, a beading tool on the holder having a reciprocably forked tube engaging portion adapted to form a bead on the tube progressively about the tube periphery, said tube engaging portion being located approximately at the center of said arcuate guide means so that the tool is pivotable about the tube end to vary the angle of approach of the tool to the tube from outward to inward, means for rotating the carrier and simultaneously moving the holder on the guide means, means mounting the tool on the holder for limited pivotal movement about an axis parallel to the holder pivot axis during rotation of the carrier and movement of the holder on the carrier thereby to enable conformation of the tube engaging portion of the tool to different tube diameters, and cooperable stop means on the tool and the holder for limiting said last mentioned pivotal movement to a predetermined amount in opposite directions.

4. A tube beading apparatus as defined in claim 3, wherein the beading tool comprises an air hammer for reciprocating said tube engaging portion and having a base at the end opposite from the tube engaging portion and wherein said means mounting the tool for pivotal movement on the holder comprises, a semi-cylindrical bearing seat on the holder concentric with said parallel pivot axis and facing outwardly toward the tool, a cylindrical bearing on the base of the air hammer transverse to the axis thereof and positioned in said seat, and means on the holder retaining the bearing in the seat for pivotal movement.

5. A tube beading apparatus as defined in claim 4, including a friction block reciprocable in a recess in said bearing seat, and means yieldably urging the block against the cylindrical bearing to frictionally retain the bearing in position against accidental movement.

References Cited in the file of this patent
UNITED STATES PATENTS

| | | |
|---|---|---|
| 720,052 | McKibben | Feb. 10, 1903 |
| 2,890,737 | Cleaver | June 16, 1959 |